United States Patent [19]
Taniguchi et al.

[11] Patent Number: 5,314,508
[45] Date of Patent: May 24, 1994

[54] SOLID ELECTROLYTE FUEL CELL AND METHOD FOR MANUFACTURE OF SAME

[75] Inventors: Noboru Taniguchi, Osaka; Junji Niikura, Hirakata; Kazuhito Hatoh, Daito; Takaharu Gamo, Fujiidera, all of Japan

[73] Assignee: Matsushita Electric Industrial Co., Ltd., Kadoma, Japan

[21] Appl. No.: 74,784

[22] Filed: Jul. 30, 1993

Related U.S. Application Data

[60] Division of Ser. No. 942,373, Sep. 9, 1992, Pat. No. 5,244,753, which is a continuation-in-part of Ser. No. 706,977, May 29, 1991, abandoned.

[30] Foreign Application Priority Data

May 29, 1990 [JP] Japan ................................. 2-141051
Aug. 20, 1990 [JP] Japan ................................. 2-219295

[51] Int. Cl.⁵ .............................................. H01M 6/00
[52] U.S. Cl. .................................... 29/623.5; 429/30; 427/115
[58] Field of Search .................... 29/623.5; 427/115; 429/30-33

[56] References Cited

U.S. PATENT DOCUMENTS

| | | | |
|---|---|---|---|
| 4,562,124 | 12/1985 | Ruka | 429/30 |
| 4,598,028 | 7/1986 | Rossing et al. | 429/30 |
| 5,169,731 | 12/1992 | Yoshimura et al. | 29/623.1 X |
| 5,171,646 | 12/1992 | Rohr | 429/34 |

OTHER PUBLICATIONS

N. Taniguchi et al., "Proton conductive properties of gadolinium-doped barium cerates at high temperatures", *Solid State Ionics* 53–56, at pp. 998–1003 (1992).

K. Knight et al., "Crystal Structures of Gadolinium- and Yttrium- doped Barium Cerate", *J. Mater. Chem.* 2(7), at pp. 709–712 (1992).

T. Scherban et al., "Raman Scattering Study of BaCeO₃ And SrCeO₃", *Solid State Communications*, vol. 00, No. 0, at pp. 1–4 (Apr. 1992).

*Primary Examiner*—Anthony Skapars
*Attorney, Agent, or Firm*—Ratner & Prestia

[57] ABSTRACT

This invention provides a solid electrolyte fuel cell operable with high efficiency even in the temperature range of about 850° to 650° C., The invention is characterized by the use of a novel perovskite double oxide of the composition $A_xB_yO_{3-\alpha}$. The fabrication of the electrolyte, air electrode and fuel electrode layers by tape casting has contributed to marked improvement in processability and productivity.

3 Claims, 7 Drawing Sheets

SOLID ELECTROLYTE FUEL CELL AND METHOD FOR MANUFACTURE OF SAME

This application is a division of application Ser. No. 07/942,373, filed Sep. 9, 1992, now U.S. Pat. No. 5,244,753, which is a continuation-in-part of application Ser. No. 07/706,977, filed May 29, 1991, (abandoned).

FIELD OF THE INVENTION

The present invention relates to a solid electrolyte fuel cell and a method for manufacture thereof.

BACKGROUND OF THE INVENTION

Unlike the fuel cells employing liquid electrolytes such as the phosphoric acid fuel cell (PAFC) and the molten carbonate fuel cell (MCFC), the solid electrolyte fuel cell is free of leakage trouble and does not require refills so that it is expected to be maintenance-free. The solid electrolyte fuel cells heretofore available can be classified, according to the electrolyte characteristics, into the low-temperature type cell which is operated at a temperature not exceeding about 200° C. and the high-temperature type cell which is operated at a temperature of about 1000° C.

Regarding the low-temperature solid electrolyte fuel cell, the cell utilizing a solid polymer electrolyte (SPE), which is a protonically conductive cation exchange membrane, has already been partially implemented for space and other applications. However, since this fuel cell is driven at a low temperature, its energy conversion efficiency is low and the compatible fuel is also limited to hydrogen gas. Moreover, since a large amount of platinum catalyst must be used in the positive and negative electrodes, the cell is too costly for civil applications.

Regarding the high temperature-operated solid electrolyte fuel cell, research has been underway for some time on cells utilizing solid oxides and these cells are generally known as SOFC. As an electrolyte for the SOFC, yttria stabilized zirconia (YSZ) is a favorite subject of research today. The SOFC employing this electrolyte, which exhibits excellent oxide-ionic conductivity at high temperature, is generally operated at 1000° C. The open-circuit voltage of the SOFC at 1000° C. is as low as about 1.0 V but since it is driven at a high temperature, this SOFC provides a high output and can be applied to cogeneration utilizing the quality high-temperature spent heat so that this fuel cell is expected to serve as an energy converter with high energy conversion efficiency. Furthermore, this fuel cell is versatile in the compatible fuel and does not require an expensive catalyst for positive and negative electrodes, thus offering a potential of cost reduction in future exploitation. On the other hand, for the very reason that it is of the high-temperature type, many kinds of ceramics are used for the components of the cell proper and the peripheral parts such as shield members from the standpoint of heat resistance.

For example, generally alumina type reinforced ceramics are used for the cell housing, a perovskite type electronically conductive oxide based on porous La-CoO$_3$ for the positive air electrode, and a porous cermet of nickel and stabilized zirconia for the negative fuel electrode. However, these component materials have the drawback that they are deficient in mechanical strength and low in long-term operation reliability. Moreover, the cermet air electrode is inferior to the metal electrode in electrical conductivity. With regard to the cermet fuel electrode, it is for suppressing the aging in performance due to oversintering of metallic Ni that the ceramic stabilized zirconia is added but this addition leads to an increased polarization, thus frustrating the effort to improve the discharge characteristic.

To solve those problems, it might be contemplated to lower the operating temperature to a range of 850° to 650° C. and increase the proportion of metallic materials, which are tough and high in electrical conductivity and mechanical strength, for the components and parts of the fuel cell. However, the conventional electrolyte YSZ suffers a marked decrease in ionic conductivity as the temperature is decreased to 850° C. or lower. Therefore, development of a solid electrolyte material showing high ionic conductivity even in a temperature range of 850° to 650° has been earnestly demanded. Furthermore, a molding method by which such electrolyte can be provided in the form of a thin layer has been considered to be an important subject of study.

SUMMARY OF THE INVENTION

To overcome the aforesaid disadvantages of the high-temperature-operated SOFC employing the conventional YSZ, the present invention proposes the use of a novel perovskite double oxide which is mixed ionically conductive formed of protons and oxide-ions and exhibites high ionic conductivity in the temperature range of 850° to 650° C. as the fuel cell electrolyte. For the commercial-scale preparation of this novel electrolyte in the form of a thin layer, the invention employs a tape casting technique. Then, a positive air electrode and a negative fuel electrode are formed, each in a thin layer, on respective sides of the resulting electrolyte layer to provide a cell element sheet and finally a fuel cell is fabricated using the cell element sheet. By the above procedure, the present invention provides a low cost solid electrolyte fuel cell generating a high output with long-term operation reliability even at an operating temperature of 850° C. or below. The present invention further provides the use of a nickel oxide, or nickel oxide based compound as the air electrode, and nickel or a nickel alloy as the fuel electrode.

BRIEF DESCRIPTION OF THE DRAWINGS

In the respective views, the reference numeral 1 indicates a solid electrolyte, 2 a positive air electrode, 3 a negative fuel electrode, 4 a sealing material, 5 a cell housing, 6 a quartz tube for gas supply, 7 a platinum lead wire, and 8 a porous support.

DETAILED DESCRIPTION OF THE PREFERRED EMBODIMENTS

The present invention employs a mixed protonically and oxide-ionically conductive material for high-temperature-operated solid electrolyte fuel cells.

Regarding the oxide-ionic conductors, bismuth oxides such as $Bi_2O_3$, ceria of the formula $CeO_2$, perovskite oxides such as $BaCoO_3$, thoria, hafnium oxide, zirconia, etc., have been investigated but no materials surpassing the YSZ in performance have been discovered as yet. The ionic conductivity of YSZ is about $1 \times 10^{-1}$ s/cm at 1000° C. but declines sharply as the temperature is lowered and stands only at about $1 \times 10^{-2} - 1 \times 10^{-3}$ S/cm at about 850° C. As the temperature is further lowered, the resistance increases to the extent that the cell is no longer practically useful. Therefore, the SOFC employing YSZ as the electrolyte is generally operated at 1000° C.

In contrast to such oxide-ionic conductors, it has been reported that perovskite oxides available by partial substitution of cerium in $SrCeO_3$ and $BaCoO_3$ with one or more other elements exhibiting protonic conductivity in the presence of hydrogen gas at temperatures near 1000° C. and prototype high temperature-operated solid electrolyte fuel cells of this kind were fabricated [e.g. H. Iwahara et al., Denkikagaku 58, 178 (1989)]. However, these electrolytes are disadvantageous in that they are inferior to YSZ in ionic conductivity and, hence, do not yield a sufficiently high output.

The present invention relates, in a first aspect, to a solid electrolyte fuel cell employing, as the electrolyte, a novel perovskite double oxide exhibiting excellent mixed protonic-oxide ionic conductivity in a temperature region of 850° to 650° C. The fuel cell produces a high output with excellent long-term operation stability even at temperatures of 850° C. and below.

The present invention relates, in a second aspect, to a method of manufacturing such a solid electrolyte fuel cell at low cost. The method comprises molding a finely divided powder of the novel perovskite double oxide defined above into a thin layer by the tape casting technique, sintering the perovskite double oxide layer, depositing a positive air electrode layer on one side of the layer and a negative fuel electrode on the other side to provide a cell element sheet, and assembling it into a fuel cell. The positive and negative electrodes may be simultaneously sintered.

The electrolyte for a solid electrolyte fuel cell according to the present invention consists, as its main ingredient, of a mixed ionically conductive body of proton and oxide-ion comprised of perovskite-type double oxide shown by a general formula $A_xB_yO_{3-\alpha}$, where $x=1$, $y=1$, and $0.25 < \alpha < 0.50$, and A involves at least one element selected from the group of Mg, Ca, Sr, and Ba, the sum of whose mol number is within $0.5 \sim 1.0$, and if it is less than 1, A is filled up by one of the elements Al, V, Zr, Nb, Ta, W, or Bi, and B is comprised of at least one element selected from the group of Y, La, Pr, Nd, Pm, Sm, Eu, Gd, Tb, Dy, Ho, Er, Tm, and Yb. When a perovskite type double oxide of the above composition and having oxide deficit, mixed ionical conduction of protons and oxideions is obtained.

EXAMPLE 1

The method for synthesizing a perovskite double oxide to be used as the electrolyte in the present invention is now described with $BaSm_{0.9}Y_{0.1}O_{3-\alpha}$ as an example.

Figure 1:
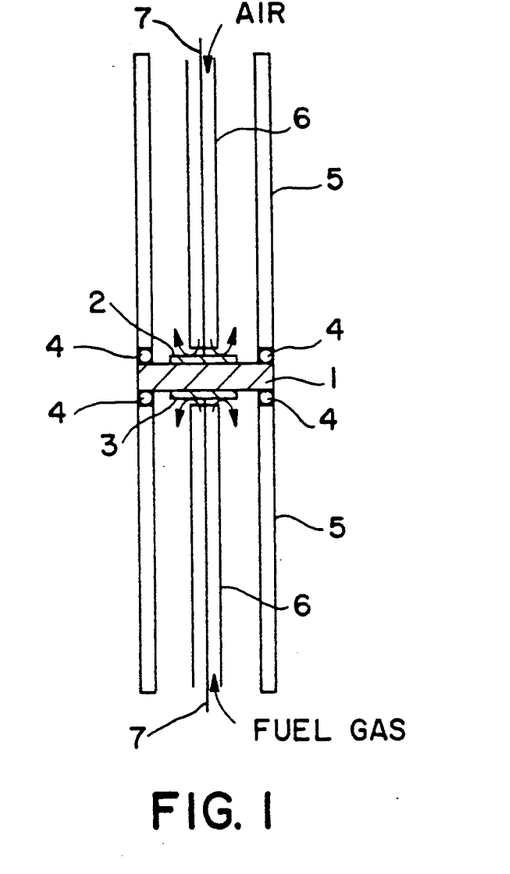
FIG. 1 is a sectional view showing the principle portion of a test unit cell of a solid electrolyte fuel cell according to the invention.
Figure 2:
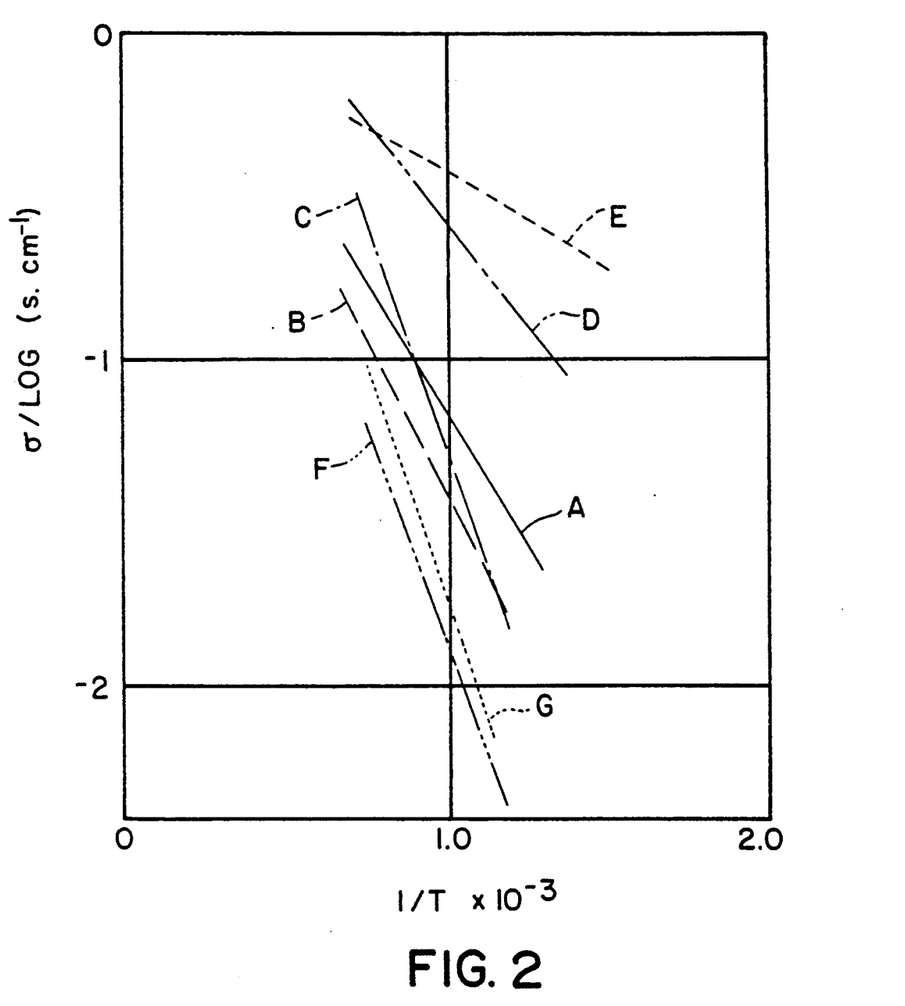
FIG. 2 is a diagram showing the temperature dependency of ionic conductivity of the solid electrolytes according to the invention, as compared with as compared with the conventional solid electrolyte material of YSZ which is a very famous example of the oxide-ionic conductor and the perovskite oxide BaCe$_{0.9}$Yb$_{0.1}$O$_{3-\alpha}$ which is an example of the known protonic conductor.
Figure 3:
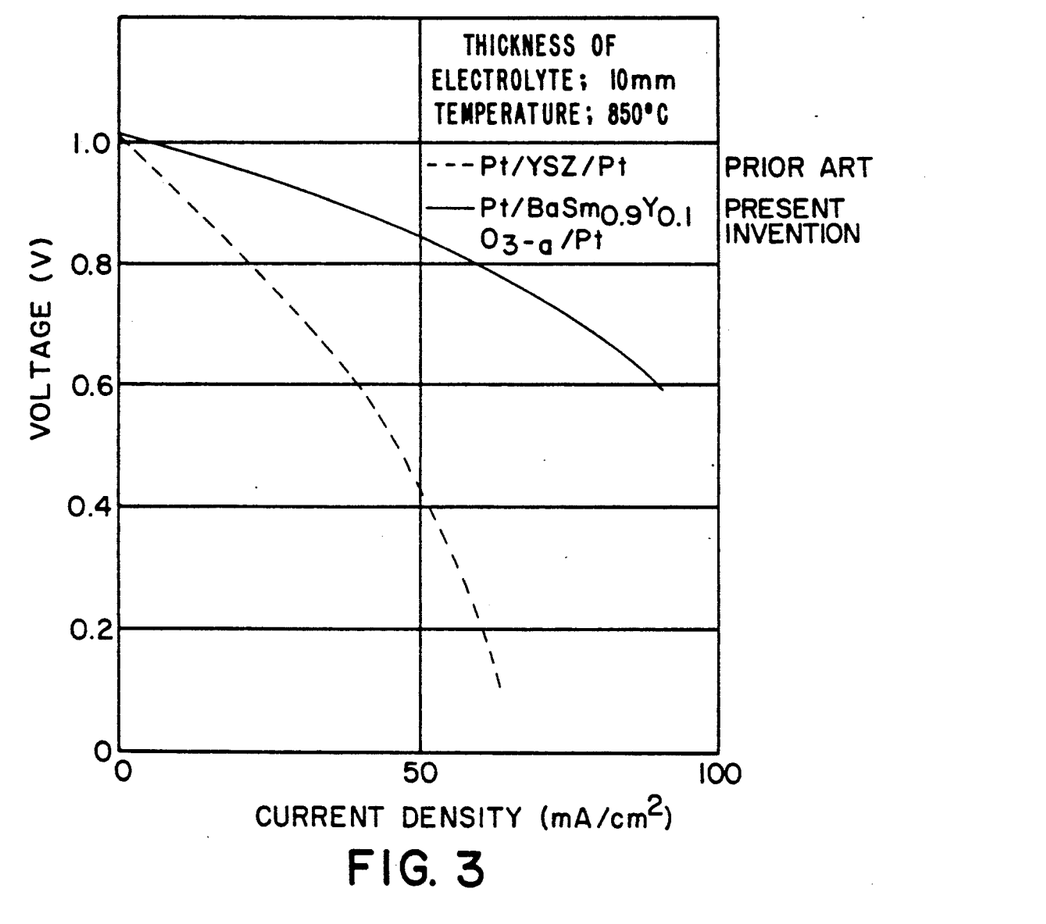
FIG. 3 is a comparative current/voltage (I-V) characteristic diagram of the solid electrolyte fuel cell employing an example (BaSm$_{0.9}$Y$_{0.1}$O$_{3-\alpha}$) of the electrolyte of the invention and the fuel cell employing the conventional YSZ as the electrolyte.

Powders of BaCo, $Sm_2O_3$ and $Y_2O_3$ are weighted in a mole ratio of 1:0.45:0.05 and mixed thoroughly in a ball mill. The mixture was subjected to calcining and pulverizing at least twice to give a finely divided powder. This powder was molded at a pressure of 2 tons/cm$^2$ and sintered at 1600°-1700° C. for about 10 hours to give a sintered disk 14 mm in diameter and 1.0 mm thick. This sintered disk was very high in density and was confirmed by x-ray diffraction analysis to be composed of a uniform polycrystalline phase. By the same procedure as above, several perovskite double oxides within the composition range of the invention were synthesized and sintered to prepare sintered disk specimens of the same dimensions as above. Both sides of each disk specimen were coated with a platinum black paste, dried and baked in the routine manner to provide porous platinum positive and negative electrodes, 7 mm in diameter, in concentrically opposed relation. First, the ionic conductivity between the two electrodes was measured by the alternating current method at varying temperatures. The results are shown in FIG. 2. For reference, the literature ionic conductivity values of YSZ and $BaCe_{0.9}Yb_{0.1}O_{3-\alpha}$, which is one of the known protonically conductive perovskite oxides, are also shown. It will be apparent from FIG. 2 that all the synthetic electrolytes of the present invention show higher ionic conductivities than the conventional YSZ and $BaCe_{0.9}Yb_{0.1}O_{3-\alpha}$, in the temperature region of 850°-650° C. Table 1 shows the ionic conductivity values of the synthetic electrolytes of the invention at 850° C. Thus, all the electrolytes are superior to YSZ, which is a well-known SOFC electrolyte, in terms of ionic conductivity, indicating that the synthetic electrolytes of the present invention are practically useful for fuel cell applications. Using the above sintered electrolyte disks and sintered YSZ electrolyte disks prepared to the same size, unit solid electrolyte fuel cells were fabricated and the current voltage (I-V) characteristics of the cells were tested at 850° C. The results are shown in FIG. 3. Thus, each of; the $BaSm_{0.9}Y_{0.1}O_{3-\alpha}$ disk; an example of the invention, and the YSZ disk was supported in the center of a test unit cell shown in FIG. 1. In FIG. 1, the reference numeral 1 indicates the test disk-shaped solid electrolyte and 2 and 3 are porous platinum electrodes baked by the above method, which serve as an air positive electrode and a fuel negative electrode, respectively. Indicated at 4 is a glass shield which softens slightly at a temperature between 650° and 850° C. and hermetically seals off the peripheral portions of the disk-shaped solid electrolyte 1 and the ends of a cylindrical cell housing 5 on the positive electrode side and the negative electrode side. A quartz tube for gas supply is disposed in the center of the cell housing 5 on each of the positive electrode side and the negative electrode side and a platinum lead wire 7 is extending into each quartz tube 6. Air was fed to the positive air electrode 2 and a mixture gas of 80% hydrogen, 19% carbon dioxide, and 1% water vapor was fed to the negative fuel electrode 3, each at a flow rate of 100 cc/min. It will be apparent from FIG. 3 that the $BaSm_{0.9}Y_{0.1}O_{3-\alpha}$ electrolyte cell as an example of the invention is superior to the YSZ electrolyte cell in output characteristics at 850° C. Of the synthetic electrolytes shown in Table 1, species of the ionic conductivity were investigated with the fuel cell of FIG. 1. The quantity of water vapour generated at the positive electrode side and the negative electrode side is measured by a hygrometer. If the ionic conduction is due to protons, water will be generated by the discharge at the air positive electrode side, while, if the ionic conduction is due to oxide-ions, water will be produced at the fuel negative electrode side.

As the result of measurement at 600°–1000° C., it was confirmed that every synthetic electrolyte according to the present invention is, at the temperature range of 650°–850° C. which is appropriate for usage, a mixed protonically and oxide-ionically conductive material.

Figure 7:
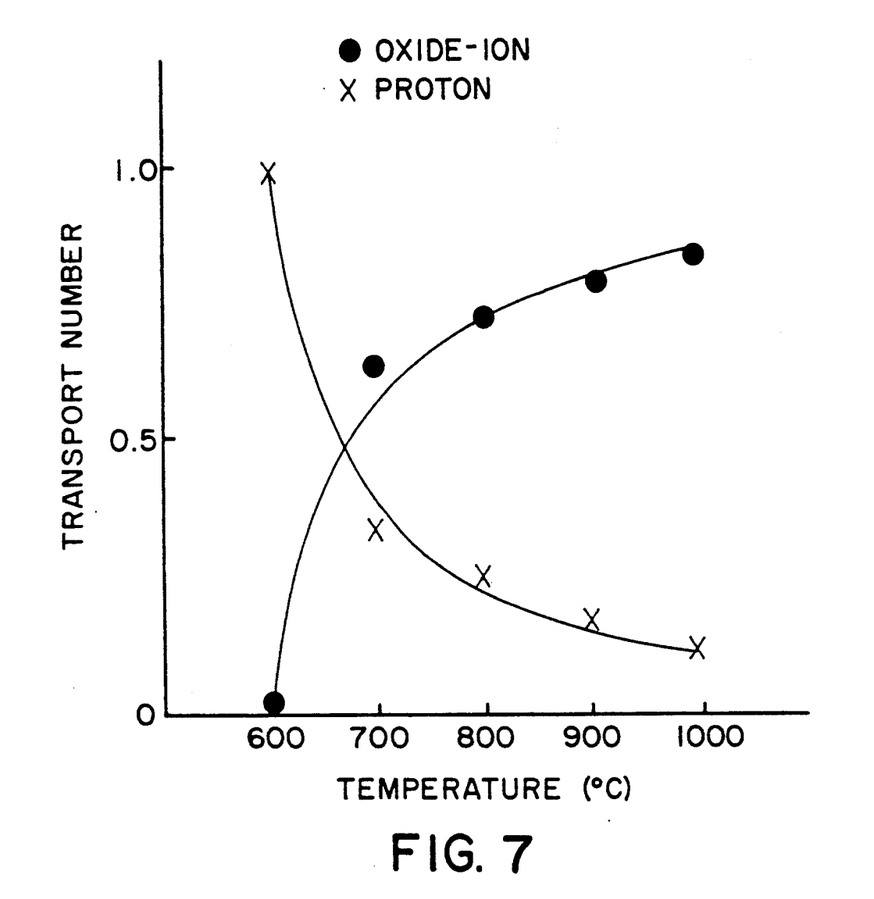
FIG. 7 is a graph showing the relationship of transport number to the temperature of the proton and oxide-ion of $BaSm_{0.9}Y_{0.1}O_{3-\alpha}$, an example of a solid electrolyte according to the present invention.

The result of measurement on $BaSm_{0.9}Y_{0.1}O_{3-\alpha}$, an example of the present invention, is shown in FIG. 7.

The advantage of the solid electrolyte of mixed ionically conductive perovskite-type double oxide of protons and oxide-ions according to the present invention is not confined to the possible high output power under 850° C.

Cracks in ceramic material including electrolyte layer, which have been a problem for YSZ, are prevented, since the protons and oxide-ions move simultaneously and, at the air and fuel electrodes on both sides of the electrolyte, water is produced simultaneously, resulting in improvement of the thermal balance and the balance of income and outgo of material.

TABLE 1

| Electrolyte | Ionic conductivity (S/cm) |
| --- | --- |
| $BaSm_{0.9}Y_{0.1}O_{3-\alpha}$ | $1 \times 10^{-1}$ |
| $Sr_{0.9}Nb_{0.1}Sm_{0.9}Y_{0.1}O_{3-\alpha}$ | $5 \times 10^{-2}$ |
| $Ba_{0.9}Ta_{0.1}La_{0.9}Y_{0.1}O_{3-\alpha}$ | $1 \times 10^{-2}$ |
| $Sr_{0.9}W_{0.1}La_{0.9}Pr_{0.1}O_{3-\alpha}$ | $8 \times 10^{-2}$ |
| $Ba_{0.9}Al_{0.1}Sm_{0.9}Pm_{0.1}O_{3-\alpha}$ | $2 \times 10^{-2}$ |
| $Sr_{0.9}Bi_{0.1}Sm_{0.9}Gd_{0.1}O_{3-\alpha}$ | $5 \times 10^{-2}$ |
| $CaLa_{0.9}Nd_{0.1}O_{3-\alpha}$ | $3 \times 10^{-2}$ |
| $Mg_{0.5}Zr_{0.5}La_{0.9}Tb_{0.1}O_{3-\alpha}$ | $9 \times 10^{-3}$ |
| $CaSm_{0.9}Yb_{0.1}O_{3-\alpha}$ | $5 \times 10^{-3}$ |
| $Mg_{0.9}V_{0.1}La_{0.9}Eu_{0.1}O_{3-\alpha}$ | $2 \times 10^{-2}$ |
| $CaLa_{0.95}Dy_{0.05}O_{3-\alpha}$ | $1 \times 10^{-1}$ |
| $Sr_{0.5}Ca_{0.5}Ho_{0.9}Er_{0.1}O_{3-\alpha}$ | $2 \times 10^{-1}$ |
| $Sr_{0.5}Mg_{0.5}La_{0.9}Tm_{0.1}O_{3-\alpha}$ | $4 \times 10^{-1}$ |

EXAMPLE 2

In the SOFC operated at 1000° C., for the purpose of preventing aging in characteristics due to reaction with the electrolyte and phase change, a perovskite double oxide based on $LaCoO_3$ or the like is used as the positive air electrode. Using the $Sr_{0.9}Nb_{0.1}Sm_{0.9}Y_{0.1}O_{3-\alpha}$ electrolyte, which was shown in Table 1, a porous platinum electrode layer for the fuel electrode was baked on one side of a disk of the solid electrolyte, 14 mm in diameter and 1.0 mm thick as in Example 1. Then, the other side of the disk was coated with a paste of finely divided nickel oxide as an example of the invention or a powder of the conventional perovskite double oxide $LaCo_{0.9}Cr_{0.1}O_3$ for SOFC, using an aqueous solution of polyvinyl alcohol as a binder, followed by drying and sintering. Each of these porous electrolyte specimens was set in the test unit cell shown in FIG. 1 and an I-V characteristic test and a 1000-hour continuous discharge test with a constant current of 100 mA/cm² in the temperature region of 850°–650° C. The air and fuel gas were respectively supplied under the same conditions as in Example 1. The results indicated that compared with the conventional perovskite double oxide $LaCo_{0.9}Cr_{0.1}O_3$, the use of nickel oxide for the air electrode in accordance with the present invention reduced the polarization to about one-fifth. Moreover, even after 1000 hours of continuous discharge, the electrolyte and the nickel oxide electrode showed no signs of reaction and the discharge characteristics had remained almost unchanged. In contrast, the conventional perovskite oxide $LaCo_{0.9}Cr_{0.1}O_3$ electrode apparently diffused into the perovskite double oxide electrolyte as shown by a larger polarization and aging. While the nickel oxide air electrode was used in this example, some improvement has been found in chemical stability when an air electrode based on nickel oxide and supplemented with cobalt oxide was employed.

EXAMPLE 3

Since the SOFC is operated at a high temperature, a porous cermet consisting of nickel metal and stabilized zirconia is generally used for the negative fuel electrode. As in Example 2, for the preparation of the positive air electrode, a double oxide of $NiO:CoO=9:2$ was baked on one side of a solid electrolyte disk molded from the conventional YSZ or $Sr_{0.9}Nb_{0.1}Sm_{0.9}Y_{0.1}O_{3-\alpha}$, which is an example of the invention. Then, for the preparation of the negative fuel electrode, the other side of the electrolyte disk was coated with nickel carbonyl as an example of the invention or the conventional SOFC cermet as a control followed by drying and sintering. These specimens were tested under the same conditions as in Example 2. Compared with the fuel electrode formed from the conventional cermet, the porous nickel fuel electrode used in the solid electrolyte fuel cell of the invention showed a polarization as small as about one-seventh, and substantially no aging of characteristics even after 1000 hours of continuous discharge. While reference has been made solely to nickel carbonyl as the fuel electrode material in the above description, equivalent characteristics are obtained when finely divided powders of nickel-based alloys such as Ni-Co, Ni-Fe-Co, Ni-Fe-Mo and Ni-Fe-Co-Mo alloys are used.

EXAMPLE 4

While, in the foregoing examples 1, 2, and 3, the fuel cell solid electrolyte according to the present invention was manufactured by pressure-molding the perovskite double oxide powder and sintering. The process is not suitable for commercial exploitation because of limitations on producing a sufficiently large area as the electrolyte. Therefore, a tape casting technique was used for achieving an increased area of the product electrolyte.

First, $CaCO_3$, $La_2O_3$ and $Dy_2O_3$ were weighed in a mole ratio of 2:0.95:0.05 and mixed in a planetary ball mill. The mixture was subjected to repeated calcining, pulverizing and mixing at least twice. The resulting fine powder of $CaLa_{0.95}Dy_{0.05}O_{3-\alpha}$ was kneaded with propylene glycol to provide a paste. By the tape casting technique based on the principle of screen printing, this paste was uniformly coated on carried sheet laminated with a polyethylene film, dried and pressed with a roll.

The electrolyte layer thus formed was peeled off from the carrier sheet, placed on a flat sintered alumina plate and sintered in air at 1200° C. to provide an electrolyte sheet. Then, a paste of mixed NiO and CoO powders was coated on one side of the above electrolyte sheet by the tape casting technique using a roll coater, dried and sintered to provide an air electrode.

Figure 4:
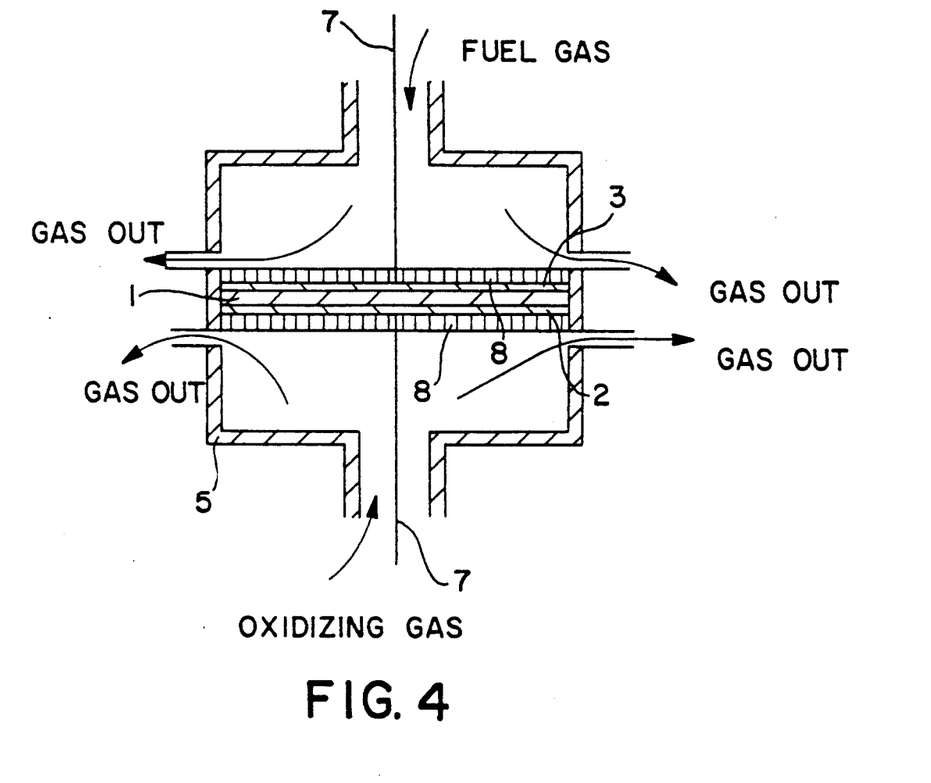
FIG. 4 is an cross sectional view of a test unit cell of the solid electrolyte fuel cell of the present invention.
Figure 5:
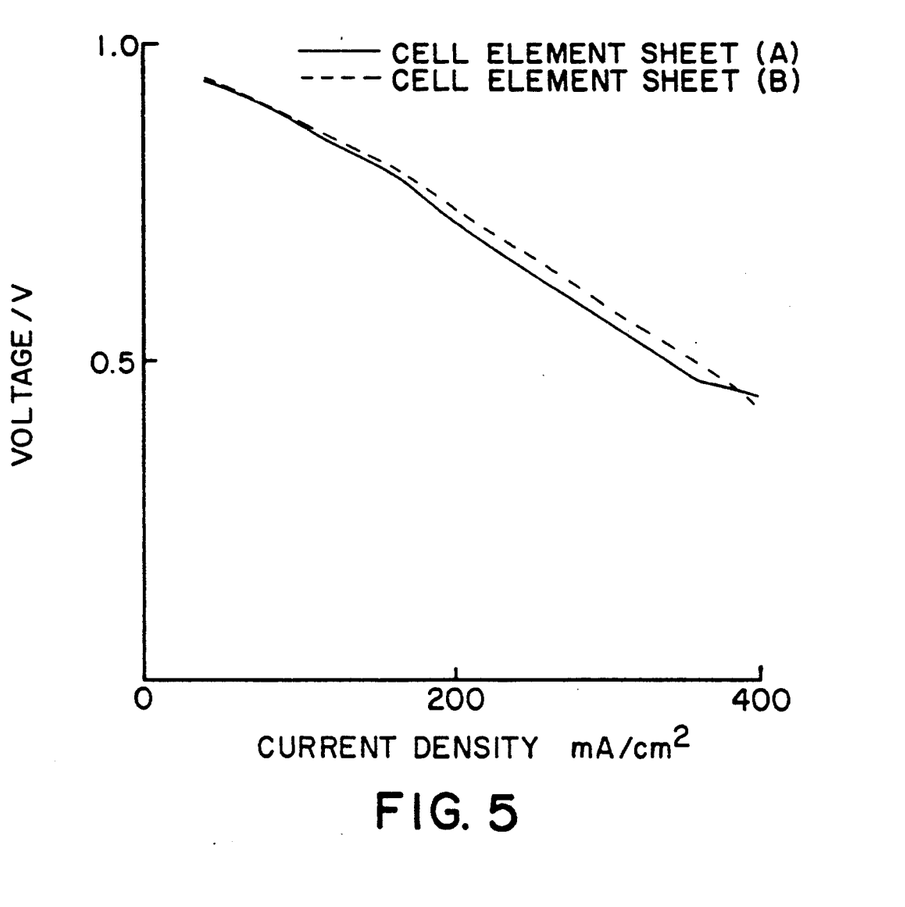
FIG. 5 is a comparative current/voltage (I-V) characteristic diagram of the solid electrolyte fuel cells fabricated from cell element sheets which were manufactured by the tape casting technique described in Example 4, on the face and reverse sides of an electrolyte layer obtained by a similar tape casting method.

Similarly, by the tape casting technique, the other side of the same electrolyte sheet was spray-coated with a paste prepared by kneading an atomized powder of a nickel based Ni-Fe-Co-Mo alloy with an aqueous solution of carboxymethylcellulose (CMC), dried and sintered in a nitrogen atmosphere to provide an integral cell element sheet A, as shown in FIG. 5. Similarly, using an unsintered electrolyte sheet, an air electrode and a fuel electrode were constructed on respective sides and, after drying, all the layers were sintered as a unit in a nitrogen atmosphere to provide a cell element sheet B. These cell element sheets (A and B) were manufactured to the same size of 50 mm×50 mm. Each of these specimens was set in a test unit cell shown in FIG. 4 and tested for characteristics at 850° C. In FIG. 4, the reference numeral 1 indicates a solid electrolyte layer, 2 a positive air electrode, 3 a negative fuel electrode, 5 a cell housing, 7 lead wires of positive and negative electrodes, and 8 a porous support plate. The air and fuel gases were respectively introduced at a common flow rate of 200 cc/min. The composition of the fuel gas was the same as used in the preceding example. The I-V characteristics are compared in FIG. 5. No remarkable difference was found in I-V characteristics between the cell element sheet A in which the positive and negative electrodes formed by tape casting had been individually sintered and the cell element sheet B in which all the cell elements had been simultaneously sintered, indicating that the tape casting technique is an effective method for the formation of the positive and negative electrodes.

EXAMPLE 5

Figure 6:
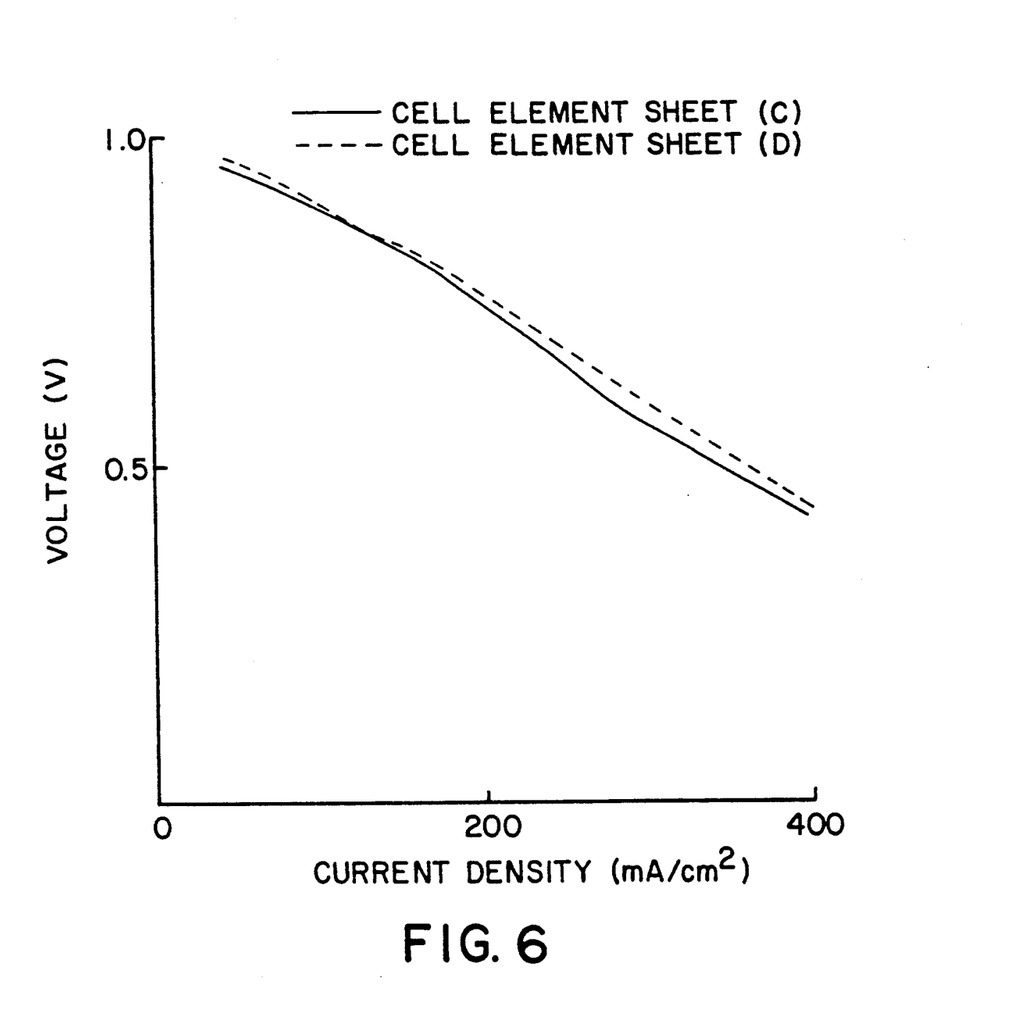
FIG. 6 is a comparative current/voltage (I-V) characteristic diagram of a fuel cell consisting of the novel solid electrolyte of the invention as sandwiched between a positive air electrode and a negative fuel electrode and assembled after sintering; and a fuel cell of the same construction as sintered in situ after assembling.

The results of Example 4 indicated that the usefulness of the procedure of forming a positive and a negative electrode by tape casting on respective sides of an electrolyte sheet molded by tape casting and sintering them as a unit. However, since the integral cell element sheet is friable, meticulous care is required in handling, particularly in cell assembling. Therefore, an attempt was made to prepare an integral cell element sheet consisting of unsintered cell elements on a carrier sheet, fabricate a fuel cell using this flexible cell element sheet, and sinter the cell elements in situ within the assembled cell at the beginning of operation of the fuel cell. The materials used in this example were exactly the same as those used in Example 4. First, a positive air electrode layer, an electrolyte layer and a negative fuel electrode layer were successively formed by tape casting and dried on a carrier sheet and the resulting cell element sheet was cut to size. This unsintered cell element sheet (C) was assembled into a unit fuel cell as illustrated in FIG. 4. Then, with the air and fuel gas being fed to the air electrode and the fuel electrode, respectively, each at a flow rate of 100 cc/min., the fuel cell was maintained at 1000° C. for 24 hours for sintering. As a control, an integral cell element sheet consisting of unsintered cell elements was first sintered in a nitrogen atmosphere at 1000° C. for 24 hours to provide a sintered cell element sheet (D) which was then assembled into a unit fuel cell. The I-V characteristics of the above two cells were compared. The results are shown in FIG. 6. Substantially no difference was found between the two fuel cells. Since the fuel cell can thus be assembled from an unsintered flexible cell element sheet fabricated by tape casting, a larger fuel cell can now be fabricated and, in addition, the ease of handling is increased to contribute to enhanced productivity. It should, of course, be understood that while the order of deposition of layers began with the air electrode in the above description, the order may be reversed as desired.

The present invention, thus, provides a solid electrolyte fuel cell having advantageous features as mentioned above through the use of a novel perovskite double oxide exhibiting high ionic conductivity in the temperature region of 850° to 650° C. as the electrolyte. Though not described in detail in the above examples, tough metallic materials, in lieu of ceramics, can be used as structural members of the fuel cell to improve the mechanical strength and long-term reliability of the fuel cell.

What is claimed:

1. A method of manufacturing a solid electrolyte fuel cell, comprising the steps of:
   forming a solid electrolyte layer by tape casting;
   sintering said layer;
   forming an air electrode layer for a positive electrode on one side of said solid electrolyte layer by tape casting;
   forming a fuel electrode layer for a negative electrode on the other side of said solid electrolyte layer by tape casting; and
   simultaneously sintering said positive and negative electrodes.

2. A method of manufacturing a solid electrolyte fuel cell comprising sequentially:
   forming, on a carrier sheet, one of;
      an air electrode layer for a positive electrode, or
      a fuel electrode layer for a negative electrode by tape casting;
   forming an electrolyte layer by tape casting;
   forming another of;
      an air electrode layer for a positive electrode, or
      a fuel electrode layer for a negative electrode,
      by tape casting, to form a single unit;
   removing said electrode-electrolyte-electrode unit from said carrier sheet;
   sintering said unit to provide an integral cell element sheet; and
   assembling a fuel cell using said sheet.

3. A method of manufacturing a solid electrolyte fuel cell comprising sequentially:
   forming, on a carrier sheet, one of;
      an air electrode layer for a positive electrode, or
      a fuel electrode layer for a negative electrode by tape casting;
   forming an electrolyte layer by tape casting;
   forming another of;
      an air electrode layer for a positive electrode, or
      a fuel electrode layer for a negative electrode,
      by tape casting, to form a single unit;
   removing said electrode-electrolyte-electrode unit from said carrier sheet, to provide an integral cell element sheet;
   assembling a fuel cell using said sheet; and
   sintering said layers as a unit while said positive electrode and negative electrode are supplied with air and fuel gas, respectively.

* * * * *